United States Patent [19]
Smith et al.

[11] Patent Number: 5,643,456
[45] Date of Patent: Jul. 1, 1997

[54] PROCESS FOR THE DISPLACEMENT OF CYANIDE IONS FROM METAL-CYANIDE COMPLEXES

[75] Inventors: Barbara F. Smith; Thomas W. Robinson, both of Los Alamos, N.M.

[73] Assignee: The Regents of the University of California, Los Alamos, N.M.

[21] Appl. No.: 453,597

[22] Filed: May 30, 1995

[51] Int. Cl.$^6$ .......................... B01D 15/02; B01D 61/26; C02F 1/44
[52] U.S. Cl. .......................... 210/651; 210/698; 210/904; 210/911; 423/24
[58] Field of Search .................................. 210/638, 651, 210/904, 649, 650, 912, 913, 914, 911; 75/735, 737; 423/24, 29, 32

[56] References Cited

U.S. PATENT DOCUMENTS

| | | | |
|---|---|---|---|
| 4,741,831 | 5/1988 | Grinstead | 210/638 |
| 4,770,784 | 9/1988 | Davis et al. | 210/638 |
| 4,857,159 | 8/1989 | Davis et al. | 210/748 |
| 4,895,659 | 1/1990 | Semmens et al. | 210/638 |
| 5,347,071 | 9/1994 | Moriya et al. | 588/256 |
| 5,387,365 | 2/1995 | Moriya et al. | 252/180 |
| 5,395,896 | 3/1995 | Moriya et al. | 525/328.2 |

FOREIGN PATENT DOCUMENTS

| | | | |
|---|---|---|---|
| 0437851A1 | 12/1990 | European Pat. Off. | B01J 45/00 |
| 1466150 | 12/1973 | United Kingdom | B01D 13/00 |

OTHER PUBLICATIONS

Strathmann, "Selective Removal of Heavy Metal Ions from Aqueous Solutions by Diafiltration of Macromolecular Complexes," Separation Science and Technology, vol. 15, No. 4, pp. 1135–1152 (1980).

Primary Examiner—David A. Simmons
Assistant Examiner—Kenneth M. Jones
Attorney, Agent, or Firm—Bruce H. Cottrell

[57] ABSTRACT

The present invention relates to water-soluble polymers and the use of such water-soluble polymers in a process for the displacement of the cyanide ions from the metal ions within metal-cyanide complexes. The process waste streams can include metal-cyanide containing electroplating waste streams, mining leach waste streams, mineral processing waste streams, and related metal-cyanide containing waste streams. The metal ions of interest are metals that give very strong complexes with cyanide, mostly iron, nickel, and copper. The physical separation of the water-soluble polymer-metal complex from the cyanide ions can be accomplished through the use of ultrafiltration. Once the metal-cyanide complex is disrupted, the freed cyanide ions can be recovered for reuse or destroyed using available oxidative processes rendering the cyanide nonhazardous. The metal ions are released from the polymer, using dilute acid, metal ion oxidation state adjustment, or competing chelating agents, and collected and recovered or disposed of by appropriate waste management techniques. The water-soluble polymer can then be recycled. Preferred water-soluble polymers include polyethyleneimine and polyethyleneimine having a catechol or hydroxamate group.

16 Claims, 1 Drawing Sheet

PROCESS FOR THE DISPLACEMENT OF CYANIDE IONS FROM METAL-CYANIDE COMPLEXES

FIELD OF THE INVENTION

The present invention relates to water-soluble polymers and the use of such water-soluble polymers in a process, preferably a cyclic process, for the displacement or separation of the cyanide ions contained within metal-cyanide complexes from the metal ions. The metal ions of interest are metals that give very strong complexes with cyanide that are not easily disrupted by mineral acid treatment, such metals in general including iron, nickel, zinc, cadmium, and copper. This invention is the result of a contract with the Department of Energy (Contract No. W-7405-ENG-36).

BACKGROUND OF THE INVENTION

A variety of aqueous streams, either process or waste streams, contain metal-cyanide complexes that are not easily treated to remove cyanide. Included in the various streams containing metal-cyanide complexes are aqueous electroplating and metal finishing solutions and rinse waters, aqueous processing streams from mineral leaching operations, and aqueous processing streams from the photographic industry. The annual production of cyanide-containing hazardous wastes is estimated at 5 to 6 billion gallons in the 1990's. The contaminated solid waste is considered environmentally hazardous, and the presence of the cyanide results in a significant increase in sludge disposal cost for the metal finishing industry, the mining industry and any other industry that produces metal-cyanide containing wastes.

Metal-cyanide complexes formed in these industries including metals such as iron, nickel, zinc, cobalt, cadmium, copper, mercury, and precious metals such as silver, gold, platinum and palladium are generally such strong complexes that treatment with dilute mineral acid does not readily release the cyanide ions from the metal without forcing the process, for example, by continuously removing hydrogen cyanide from the solution, by using high concentrations of mineral acid, or by strong precipitation agents such as sulfides.

Iron, for example, binds so strongly to cyanide that treatment with strong acid, even when heated for long periods of time, does not completely separate the cyanide ions from the ferric ions. Ferricyanide is a very stable species, as iron(III) has one of the highest stability constants ($\beta_6$ of $Fe(CN)_6^{3-}$=43.6) of any metal typically found in many of the waste streams. Zinc and cadmium will release cyanide ions and form hydrogen cyanide upon treatment with 10% sulfuric acid, while copper under goes this reaction only slowly.

Nor does a commonly used cyanide destruction technique, such as treatment with oxidizers such as alkaline chlorination (hypochlorite under basic conditions), easily destroy all the cyanide when it is bound to such metal ions. For example, iron, cobalt and nickel cyanides are not effected by basic hypochlorite treatment and are often precipitated in the sludge that is formed under the basic conditions of the process. In general, many treatment processes for cyanide destruction are carried out under basic conditions (pH>8) to prevent the release of any hazardous gaseous hydrogen cyanide. Thus, elevated levels of complexed cyanide can typically appear in hydroxide precipitated heavy-metal sludges produced during the treatment of many electroplating waste water solutions.

Other cyanide-containing waste streams include mineral processing streams. Cyanide is widely used in leaching precious metal ores, and is sometimes used in flotation processes for minerals. For over 50 years, cyanide leaching has been the method of choice for dissolving finely disseminated gold and silver from their ores. In typical commercial operations, dilute caustic cyanide solution is percolated through crushed or ground ore to dissolve the precious metals. This leaves a waste solution that contains some of the original free cyanide along with complexed cyanides of base metals such as iron(III) and copper(II) and of toxic metals such as mercury(II). Some ores are so high in iron that this represents a significant hazardous waste stream as there are no acceptable chemical processes for displacing cyanide from iron. Currently, these waste metal-cyanide complexes are often placed in holding ponds with the hopes that environmental and biological degradation will ultimately destroy the cyanide. Since bacterial destruction is a slow process, these exposed ponds pose severe environmental hazards to migrating animals or to potential overflow from winter runoff.

In some of these processes it is desirable to destroy the cyanide after use, in others, it is desirable to recover the cyanide for further use. It might be desirable to be able to readily recover cyanide from all these types of metal-cyanide containing waste streams from both materials and cost savings consideration. From an environmental perspective cyanide should be either recovered or fully destroyed and not be allowed to exist in landfills and ponds where it could be potentially released by the leaching action of the environment. Likewise, in some cases metal value is wasted and the metal ions that are deposited in landfills are wasted resources.

Water-soluble polymers are well known for the retention or recovery of certain metal ions from solutions under certain conditions, e.g., certain pH conditions (see, e.g., Talanta, vol. 36, No. 8, pp. 861–863 (1989) and U.S. Pat. No. 4,741,831). Additionally, higher molecular weight varieties of the water-soluble polymers such as polyethyleneimine have been used as coatings on, e.g., silica gel, for separation and recovery of metal ions. However, there has not previously been any use of a water-soluble polymer for the displacement or separation of cyanide from metal-cyanide complexes.

It has now been found that by choosing the appropriate water-soluble polymer including selected chelating groups, i.e., functionalities, that the following displacement reaction of cyanide can occur in solution:

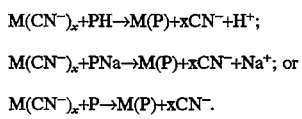

where M is the metal ion, $CN^-$ is the cyanide ion, x is the number of cyanides present in the complex, $H^+$ is a proton, $Na^+$ is a sodium ion, and PH (or PNa) is the water-soluble polymer or its sodium salt. In PH or PNa, the H or Na would be an acidic proton or the sodium salt thereof on a functional group such as a carboxylic group on the polymer. The complex, $M(CN^-)_x$, may actually have a negative charge or be neutral. When the chemical reaction is accompanied with physical separation by ultrafiltration, the polymer-metal complex is retained and the free cyanide ion passes freely through the ultrafiltration membrane. The cyanide can be recovered (see, e.g., U.S. Pat. No. 4,895,659), reused, or destroyed as desired using a variety of oxidation techniques.

The metal ions can be released from the polymer and either recovered for reuse or precipitated and solidified for proper waste management. The following equations describe some of the possible ways to recover the metal ion from the polymer:

$$M(P) + H^+ \rightarrow H(P) + M^+$$

$$M(P) + L \rightarrow ML + (P)$$

or $$M^x(P) + e^- \rightarrow M^{x-1} + (P)$$

where M is the metal ion, (P) is the water-soluble polymer, L is a competing complexant, $H^+$ is a proton from an acid, x is the valent state of the metal, and $e^-$ is an electron for an oxidation change reaction.

Therefore, it is an object of the present invention to provide a process of displacing cyanide ion from metal-cyanide complexes by use of suitable water-soluble polymers prior to a hydroxide precipitation stage or other waste management stage.

It is a further object of the present invention to provide a process of separating the metal ion from metal-cyanide complexes by use of suitable water-soluble polymers prior to a hydroxide precipitation stage or other waste management stage.

It is a still further object of the invention to provide a process of reducing the carry-over of cyanide into hydroxide precipitated sludges.

It is a still further object of the invention to provide a process of recovering cyanide for reuse from selected processes.

SUMMARY OF THE INVENTION

To achieve the foregoing and other objects, and in accordance with the purposes of the present invention, as embodied and broadly described herein, the present invention provides a process of displacing and separating cyanide ions and metal ions from metal-cyanide complexes contained in an aqueous solution, the process including contacting the aqueous solution with a reaction solution under conditions and for time sufficient to separate cyanide from the metal-cyanide complex and to form a water-soluble polymer-metal complex, the reaction solution including an effective mount of a water-soluble polymer having nitrogen-, oxygen-, or sulfur-containing groups, at least a portion of said nitrogen-, oxygen-, or sulfur-containing groups including functionalization capable of binding a metal component of a metal-cyanide complex thereby forming said water-soluble polymer-metal complex, and treating the aqueous solution by membrane separation means effective to separate cyanide, water, and other low molecular weight materials from the aqueous solution while retaining a concentrated aqueous solution of water-soluble polymer metal complex.

In another embodiment, the process further includes contacting the concentrated aqueous solution with a material selected from the group consisting of an acid, a reducing agent, and a complexant under conditions effective to release the metal ion from the water-soluble polymer-metal complex and to form regenerated water-soluble polymer. In still another embodiment, the process further includes removing the released metal ions by a secondary membrane separation means effective to separate the released metal ion from said concentrated aqueous solution including said regenerated water-soluble polymer.

In a preferred embodiment, the process includes the above steps and further includes recycling the concentrated aqueous solution including said regenerated water-soluble polymer for contact with additional metal-cyanide complex-containing aqueous solution.

In one embodiment of the process, the metal-cyanide complexes are selected from among iron cyanide, cadmium cyanide, nickel cyanide, copper cyanide and zinc cyanide.

In preferred embodiments of the present invention, the water-soluble polymer is of a formula selected from the group consisting of:

$$-(CH_2-CH_2-N(CH_2CH_2NX_1X_2))_n- \quad (i)$$

wherein $X_1$ and $X_2$ in each unit of the polymer are each a group independently selected from a substituent selected from —H;

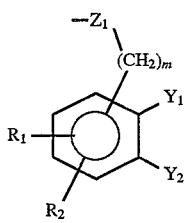

wherein $Y_1$ and $Y_2$ are selected from the OH and SH, $Z_1$ is selected from $CH_2$, C=O, —$SO_2$, and —$PO_2$, $R_1$ and $R_2$ are selected from H, alkyl, $SO_3H$, $CO_2H$, $PO_3H_2$, aminoalkyl, hydroxyalkyl, sulfoalkyl, and carboxyalkyl, m is a integer between 0 and 3, and n is an integer between about 12 and 12,000; and wherein the water-soluble polymer has a molecular weight of between about 1000 and about 1,000,000;

$$-[Q_p(CH_2)_mC(O)N(OH)R]$$

wherein Q is C=O and p is 0 or 1, R is selected from H, alkyl, and aryl, m is an integer between 1 and 5, and n is an integer between about 12 and about 12,000; and wherein the water-soluble polymer has a molecular weight of between about 1000 and about 1,000,000; or

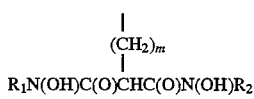

wherein $R_1$ and $R_2$ are each independently selected from H, alkyl, and aryl, m is an integer between 1 and 5, and n is an integer between about 12 and about 12,000; and wherein the water-soluble polymer has a molecular weight of between about 1000 and about 1,000,000;

$$-(CH_2CH(OX_3))_n- \quad (ii)$$

wherein $X_3$ in each unit of the polymer is a group independently selected from a substituent selected from

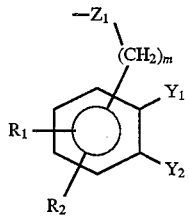

wherein $Y_1$ and $Y_2$ are selected from the OH and SH, $Z_1$ is selected from $CH_2$, C=O, —$SO_2$, and —$PO_2$, $R_1$ and $R_2$ are selected from H, alkyl, SO₃H, CO₂H, PO₃H₂, aminoalkyl, hydroxyalkyl, sulfoalkyl, and carboxyalkyl, m is a integer between 0 and 3, and n is an integer between about 24 and about 24,000; and wherein the water-soluble polymer has a molecular weight of between about 1000 and about 1,000,000;

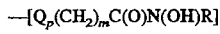

wherein Q is C=O and p is 0 or 1, R is selected from H, alkyl, and aryl, m is an integer between 1 and 5, and n is an integer between about 24 and about 24,000; and wherein the water-soluble polymer has a molecular weight of between about 1000 and about 1,000,000; or

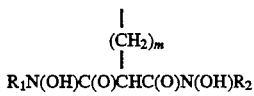

wherein $R_1$ and $R_2$ are each independently selected from H, alkyl, and aryl, m is an integer between 1 and 5, and n is an integer between about 24 and 24,000; and wherein the water-soluble polymer has a molecular weight of between about 1000 and about 1,000,000;

 (iii)

wherein $X_4$ and $X_5$ in each unit of the polymer are a group independently selected from a substituent selected from H;

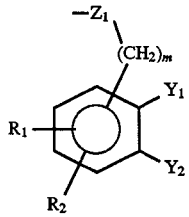

wherein $Y_1$ and $Y_2$ are selected from the OH and SH, $Z_1$ is selected from $CH_2$, C=O, —SO₂, and —PO₂, $R_1$ and $R_2$ are selected from H, alkyl, SO₃H, CO₂H, PO₃H₂, aminoalkyl, hydroxyalkyl, sulfoalkyl, and carboxyalkyl, m is a integer between 0 and 3, is 0 or 1, and n is an integer between about 24 and about 24,000; and wherein the water-soluble polymer has a molecular weight of between about 1000 and about 1,000,000;

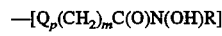

wherein Q is C=O and p is 0 or 1, R is selected from H, alkyl, and aryl, m is an integer between 1 and 5, and n is an integer between about 24 and about 24,000; and wherein the water-soluble polymer has a molecular weight of between about 1000 and about 1,000,000; or

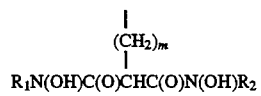

wherein $R_1$ and $R_2$ are each independently selected from H, alkyl, and aryl, m is an integer between 1 and 5, and n is an integer between about 24 and about 24,000; and wherein the water-soluble polymer has a molecular weight of between about 1000 and about 1,000,000;

 (iv)

wherein $X_6$ and $X_7$ in each unit of the polymer is a group independently selected from a substituent selected from H;

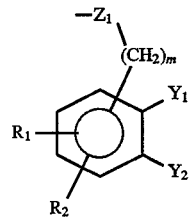

wherein $Y_1$ and $Y_2$ are selected from the OH and SH, $Z_1$ is selected from $CH_2$, C=O, —SO₂, and —PO₂, $R_1$ and $R_2$ are selected from H, alkyl, SO₃H, CO₂H, PO₃H₂, aminoalkyl, hydroxyalkyl, sulfoalkyl, and carboxyalkyl, m is a integer between 0 and 3, and n is an integer between about 24 and about 24,000; and wherein the water-soluble polymer has a molecular weight of between about 1000 and about 1,000,000;

wherein Q is C=O and p is 0 or 1, R is selected from H, alkyl, and aryl, m is an integer between 1 and 5, and n is an integer between about 24 and about 24,000; and wherein the water-soluble polymer has a molecular weight of between about 1000 and about 1,000,000; or

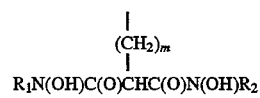

wherein $R_1$ and $R_2$ are each independently selected from H, alkyl, and aryl, m is an integer between 1 and 5, and n is an integer between about 24 and about 24,000; and wherein the water-soluble polymer has a molecular weight of between about 1000 and about 1,000,000.

In another embodiment, the present invention provides a method of displacing cyanide from metal-cyanide complexes in a waste water solution including contacting an aqueous solution including concentrations of metal-cyanide complexes selected from the group consisting of iron cyanide, cadmium cyanide, nickel cyanide, copper cyanide, and zinc cyanide with a water-soluble polymer whereby a water-soluble polymer-metal complex is formed, separating the water-soluble polymer-metal complex from the aqueous solution, said aqueous solution retaining the cyanide, and, treating the aqueous solution retaining the cyanide ion to reduce the cyanide concentrations within said aqueous solution, or recycling said aqueous cyanide-containing solution for reuse.

Still another embodiment of the present invention provides a method of recovering metal ions and reducing or recovering cyanide concentrations within a waste water solution including contacting an aqueous solution including concentrations of a metal-cyanide complex with a water-soluble polymer whereby a water-soluble polymer-metal complex is formed, separating the water-soluble polymer-metal complex from the aqueous solution, said aqueous solution retaining the cyanide, and, treating the aqueous solution retaining the cyanide to reduce the cyanide concentrations within said aqueous solution, or recycling said aqueous cyanide containing solution for reuse, and, separating the metal from the water-soluble polymer-metal complex.

DETAILED DESCRIPTION

Figure 1:
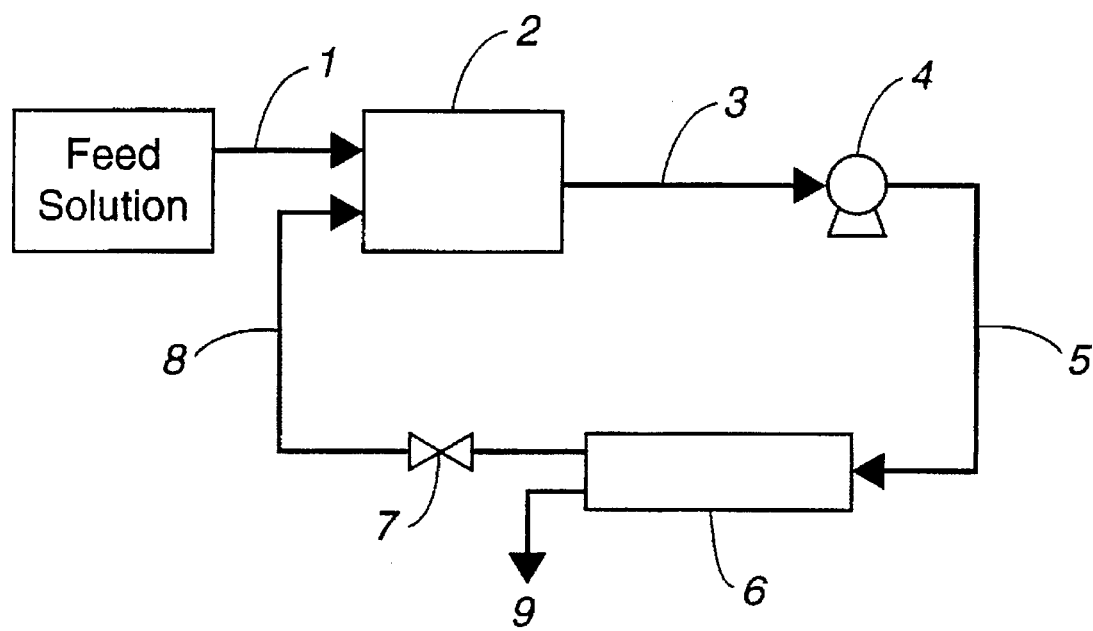
FIG. 1 illustrates a schematic diagram of an ultrafiltration process using a concentration mode of operation for cyanide displacement from metal-cyanide containing aqueous waste streams.

The present invention is concerned with the displacement of cyanide ion from metal-cyanide complexes and the recovery or destruction of cyanide ions released from the metal-cyanide complexes and the recovery of metal ions from the metal-cyanide complexes. All these materials can occur in a variety of metal-cyanide containing aqueous waste streams.

The metal ion is bound by the complexing groups on the water-soluble polymer and then subjected to a separation, such as ultrafiltration to remove the cyanide ions. The freed cyanide ions can be recovered for reuse or destroyed using available processes rendering the cyanide nonhazardous. The metal ions are then released from the polymer, using dilute mineral acid or competing complexing agents. The metal ions are collected and recovered or disposed of by appropriate waste management techniques. The water-soluble polymer is then reused.

In the process of the present invention, a water-soluble polymer adapted for complexation with a particular metal ion of the metal-cyanide complex is used to form a polymer-metal complex with the particular metal ion and therefore separated from the waste stream. By separation of the metal ion from the metal cyanide complex, the free cyanide can then be treated and essentially eliminated from the waste stream, or recovered for further process use.

Among the water-soluble polymers suitable in the present process are polyalkyleneimines such as polyethyleneimine and reaction products of polyalkyleneimines such as polyethyleneimine (PEI) with, e.g., a dihydroxybenzoic acid or a dihydroxybenzylhalide to form a catecholate. The term "catecholate" is meant to refer to a functional group including two hydroxyl groups on adjacent carbons of an aromatic ring. Also suitable would be reaction products of polyalkyleneimines such as polyethyleneimine with, e.g., a dithiolbenzoic acid or a dithiolbenzylbromide to form a thiocatecholate. The term "thiocatecholate" is meant to refer to a functional group including two thiol groups on adjacent carbons of an aromatic ring.

Preferably, any PEI used in the present invention includes both primary and secondary amine functionality. The water-soluble polymer used in the present process preferably maintains its water solubility over the process pH range of, e.g., pH 1–14. In addition to PEI as the backbone of the water-soluble polymer, other nitrogen-containing water-soluble polymer backbones such as poly(vinylamine), poly(acrylamide), and poly(allylamine) may be used. Other backbones of the water-soluble polymer may include oxygen-containing water-soluble polymer backbones such as poly(vinylalcohol).

Attachment of catechol groups to a backbone of a water-soluble poly(vinyl alcohol) may be accomplished by the reaction of the acid chloride of dihydroxybenzoic acid with poly(vinyl alcohol) in the presence of a base. In addition, the alkoxide salts of poly(vinyl alcohol) formed by the reaction of the polymer with sodium hydride in dry dimethylformamide or dimethylsulfoxide may be reacted with electrophiles of protected dihydroxybenzylhalides or dithiolbenzylhalides to form a variety of poly(vinyl alcohol) catecholates after deprotection.

Catecholate containing polymers may also contain a sulfoxide linkage between the catechol group and the nitrogen (for polyalkyleneimines) or the oxygen (for poly(vinyl alcohols)) of the polymer. This may be accomplished by chlorosulfonation of 2,3-dihydroxybenzene using chlorosulfonic acid, and the resultant product may then be joined with the water-soluble polymer, e.g., the PEI, in the same manner as a dihydroxybenzylhalide.

Generally, the concentration of the water-soluble polymer in the final mixed solution is from about 0.001 percent by weight to about 20 percent by weight, more preferably from about 0.01 percent by weight to 4 percent by weight. Use of a higher concentration of the water-soluble polymer can result in a lower flux or flow rate during an ultrafiltration stage.

After the solution containing the water-soluble polymer is contacted with the waste stream for a sufficient period of time to form water-soluble polymer-metal complex, the resultant solution can preferably be subjected to an ultrafiltration separation and the water-soluble polymer-metal complex separated from the cyanide ion containing solution. Thereafter, the metal ion can be separated or released from the water-soluble polymer-metal complex. Ultrafiltration is a pressure driven separation occurring on a molecular scale. As a pressure gradient is applied to a process stream contacting the ultrafiltration membrane, liquid including small dissolved materials, e.g., cyanide ions and water, is forced through pores in the membrane while larger dissolved materials and the like are retained in the process stream. Pressure gradients can be created as desired, from the use of vacuum systems, centrifugal force, mechanical pumping, and pressurized air and/or gas systems (e.g., nitrogen).

In an ultrafiltration stage, the aqueous solution containing the water-soluble polymer-metal complex is passed to an ultrafiltration unit as shown in, e.g., FIG. 1. Referring to FIG. 1, the process for displacing cyanide ion from the metal-cyanide complex by the water-soluble polymer includes the following steps: a metal-cyanide-containing feed solution is added via line 1 to a solution of the water-soluble polymer in tank 2. This reaction mixture is conveyed via line 3, pump 4, and line 5 to separations means 6. Generally, the separations means 6 preferably is an ultrafiltration membrane, having a MWCO less than the molecular weight of the water-soluble polymer. The separation is normally accompanied by recirculating the mixture through the membrane device having a throttle valve 7 in line 8 to maintain a pressure of less than 60 psi in the membrane unit with 25 psi being preferred. The aqueous solution which permeated through the membrane is collected as effluent 9 which contains the free cyanide. The cyanide can be destroyed or the cyanide solution reused.

Both the water-soluble polymer-metal complex and any free, i.e., water-soluble polymer are optimally retained by the membrane of the ultrafiltration unit, i.e., they do not pass through the membrane as permeate, while the solvent, i.e., water, can pass through the membrane. The retention of solutes during ultrafiltration depends on the membrane pore size. Though the molecular weight cut-off (MWCO) is generally defined as the molecular weight of spherical, uncharged solute which is 90 percent retained by the membrane, preferably in the present invention less then 0.001% Of the polymer can penetrate the membrane. This low penetration rate is achieved by pre-processing of the polymer. Thus, both size and shape can influence the MWCO. By use of ultrafiltration, the water-soluble polymer-metal complex can be separated from the solution whereafter the metal can be separated from the water-soluble polymer complex for recovery, recycling, or disposal as desired. Generally, for these applications the polymer or polymer formulation is prepared such that there is no detectable breakthrough of polymer through the membrane.

It is preferred in the present processes that use PEI as the water-soluble polymer and processes that use functionalized PEI, that the PEI be purified such that all the smaller molecular weight material is removed from the mixture. If this purification is not performed small fragments of polymer-containing-metal-complexes can pass through the UF membrane during the treatment process and the metal recovery process has limited effectiveness. The polymer can be purified using a special hollow-fiber, ultrafiltration membrane cartridge (e.g., 30,000 MWCO) that are prepared from polysulfone material in a special homogeneous fiber construction, where the microporous structure does not have macrovoids. These membranes are the only type of material that has been found to effectively purify PEI and allow for membrane washing to recover full flux rates after substantial use (e.g., UFP-10-C-5, currently manufactured by AG Technologies Corp.). The specifications for the membrane are that the hollow-fibers are composed of material that does not adhere with the PEI to any extent. The routine operational pH range of the cartridges fall between 2 and 12 with the ability to process solutions for limited periods of time (30 min) down to a pH of 0 to 1 without damage to the cartridges. Flux rates met 0.01 gallons/min/sq.ft. at 25° C. and a transmembrane pressure of 15 PSI of a solution of 5% by weight branched PEI (20,000–25,000 MW). Original flux rates of the cartridge were readily regenerated after use by a simple cleaning process of a 10 minute flush with water followed by 30 min with 500 ppm hypochlorite and rinsing with water. The cartridge had at least a minimum operational pressure of 35 PSI at 25° C. The cartridges had the ability to be operated at temperatures up to 80° C.

Figure 2:
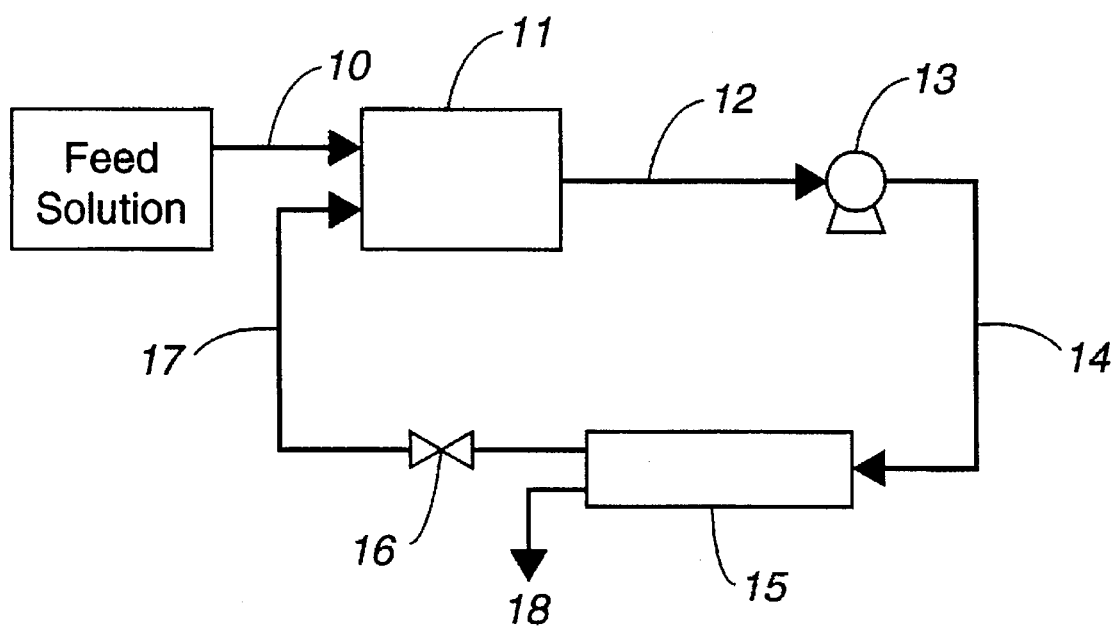
FIG. 2 illustrates a schematic diagram of an ultrafiltration process using a diafiltration mode of operation for metal ion recovery from a metal-loaded, water-soluble polymer.

Generally, there are two modes of operation in ultrafiltration. The first is a batch or concentration mode, shown in FIG. 1, where the volume in the retentate is reduced by simple filtration. The second mode is diafiltration with the ultrafiltration unit as shown in FIG. 2. Referring to FIG. 2, the process for recovering metal-ions from the metal-loaded water-soluble polymer includes the following steps: a metal stripping solution, e.g., dilute mineral acid, is added via line 10 to a solution of the water-soluble polymer in tank 11. This reaction mixture is conveyed via line 12, pump 13, and line 14 to separations means 15. Generally, the separations means 15 preferably is an ultrafiltration membrane, having a MWCO less than the molecular weight of the water-soluble polymer. The separation is normally accompanied by recirculating the mixture through the membrane device having a throttle valve 16 in line 17 to maintain a pressure of less than 60 psi in the membrane unit with 25 psi being preferred. The aqueous solution which permeated through the membrane is collected as effluent 18 which contains the metal concentrate. The metal ions can be reused or treated for proper waste management.

During diafiltration, as permeate is generated, solute-free liquid, e.g., dilute mineral acid, or deionized water, is added to the retentate at the same rate as the permeate is separated thereby maintaining constant volume within the ultrafiltration unit. In diafiltration, the lower molecular weight species in solution are removed at a maximum rate when the rejection coefficient for the membrane equals zero.

In the present process, the ultrafiltration unit can generally consist of hollow-fiber cartridges of membrane material have a MWCO from about 1000 to about 1,000,000, with the range of from about 10,000 to about 500,000 being preferable. Other membrane configurations such as spiral-wound modules, stirred cells (separated by a membrane), thin-channel devices and the like may also be used although hollow-fiber cartridges are generally preferred for the ultrafiltration unit. Among useful ultrafiltration membranes may be included cellulose acetate, polysulfone, and polyamide membranes such as polybenzamide, polybenzamidazole, and polyurethene. The polysulfone membranes have been found to be preferable.

The use of ultrafiltration for separations is further described in Kirk Othmer: Encyclopedia of Polymer Science and Engineering, 2nd Ed., vol. 17, pp 75–104, 1989, such description incorporated herein by reference.

Generally, the water-soluble polymers used in the present process have molecular weights of from about 1000 to about 1,000,000, preferably from about 10,000 to about 100,000. Above molecular weights of about 1,000,000, the polymers can lose solubility and thus are no longer water-soluble, while below molecular weights of about 1000, retention by suitable ultrafiltration membranes can present problems.

The present invention is more particularly described in the following examples which are intended as illustrative only, since numerous modifications and variations will be apparent to those skilled in the art.

EXAMPLE A

The polyethyleneimine (PEI) was prepared as follows. Crude polyethyleneimine (obtained from BASF as Polymin Waterfree PEI and as PEI homopolymer P) was obtained in two molecular weight ranges. The Polymin Waterfree polymer is reported to have a molecular weight in the range of 10,000 to 25,000, while the PEI homopolymer P is reported to have a molecular weight range of 70,000 to 750,000, depending upon the method of molecular weight measurement. In reality both of these polymer have a broad molecular weight range and have material that can pass through ultrafiltration membranes that have 10,000 MWCO and 30,000 MWCO and 100,000 MWCO. These polymers from BASF were highly branched having a primary to secondary to tertiary nitrogen ratio of approximately 1:2:1.

To demonstrate the effect of pH on polymer size a 1 wt/vol % solution of polymin water free was adjusted with acid or base to span the pH region between 2 and 10. The solutions were diafiltered through a 30,000 MWCO membrane with permeate samples taken periodically to determine polymer concentration using the copper method described below. The concentration of polymer permeating the membrane at a high pH was considerably greater (0.014% at 15 min) than that passing through at lower pH values (0.003% at 15 min). The largest difference occurred between pH 10 and 8, with the sequential lowering of the pH leading to smaller effects on the polymer size, with very little difference in size at a pH of 4 and 2. Due to this dramatic change in polymer size, polyethyleneimine was purified by diafiltration at a relatively high pH value (pH 10.8 for PEI).

The polymer was purified using hollow-fiber membranes prepared by a special extrusion process, ultrafiltration membrane cartridges prepared from polysulfone material in a special homogeneous fiber construction, where the microporous structure does not have macrovoids. These membranes were the only type of material found to purify polyethyleneimine and allow for membrane washing to recover full flux rates after substantial use (currently manufactured by AG Technologies, Corp.).

The polyethyleneimine was diluted in water to approximately 10–15% by weight. The pH was about 10.5 upon dissolution of the polyethyleneimine. The solution was diafiltered using 10,000 MWCO, 30,000 MWCO, and 100,000 MWCO membranes (keeping the volume constant) until 6–7 volume equivalents of water were passed through the system at less than or equal to 25 PSI. Following the diafiltration step, the solution volume was reduced approximately 85% to concentrate the polymer. The remaining water was removed under vacuum and mild heat to yield colorless, viscous purified polyethyleneimine. Thus, with polymin waterfree 25% by weight PEI came through the 10,000 MWCO membrane, 10% by weight PEI came through the 30,000 MWCO and not the 10,000 MWCO membrane, and 65% by weight was retained by the 30,000 MWCO membrane. With the Polymin P polymer 16% by weight passed through the 10,000 MWCO membrane, 3% by weight was less than 30,000 MWCO and greater than 10,000 MWCO, 5% by weight was less than 100,000 MWCO and greater than 30,000 MWCO, and 76% by weight was greater than 100,000 MWCO. The material resulting from the retentate from the 30,000 MWCO, when filtered on a 10,000 MWCO membrane, gave no detectable passage of the polymer through a 10,000 MWCO membrane using a copper test developed to detect less than 1 ppm of polyethyleneimine polymer. Similarly for material collected at greater than 100,000 MWCO when tested on a 30,000 MWCO membrane no detectable polymer was observed in the permeate. For some applications the polymer concentrate did not require drying but could be concentrated to a workable volume as subsequent functionalization reactions were performed in water.

The copper test involved placing 0.5 mL of the test sample into a 10 mL volumetric flask, adding 0.5 mL of a copper acetate solution (1.99 g of copper acetate diluted to 100 mL with 0.01 M HCl), 1.0 mL of pH 5.8 buffer (0.6 mL of acetic acid diluted to 100 mL with deionized water with addition of 11.2 g of anhydrous sodium acetate and sufficient sodium acetate or acetic acid to adjust pH to 5.8), and deionized water to dilute to mark. This solution was mixed well. A standard curve for an UV-VIS spectrophotometer was prepared using 0.01%, 0.02%, 0.05%, and 0.08 wt/vol % solutions of PEI. A reagent blank was used as a reference sample and read at 284 nanometers.

The specifications for the membrane included hollow-fibers of a material to which polyethyleneimine does not adhere to any significant extent, i.e., detrimental effect on flux. The routine operational pH range of the cartridges fell between 2 and 12 with the ability to process solutions down to a pH of 0 to 1 for limited periods of time (30 min) without damage to the cartridges. Minimum flux rates were 0.01 gallons/min/sq.ft. at 25° C. and at a transmembrane pressure of 15 PSI with a solution of 5% by weight branched polyethyleneimine (Polymin Waterfree 10,000–25,000 MW). Original flux rates of the cartridge were readily regenerated after use by a simple cleaning process of a 10 minute flush with water followed by 30 min with 500 ppm hypochlorite and rinsing with water. The cartridge had at least a minimum operational pressure of 50 PSI at 25° C. The cartridges had the ability to be operated at temperatures up to 80° C. For some applications the polymer concentrate did not require drying but could be concentrated to a workable volume as subsequent functionalization reactions were performed in water.

EXAMPLE B

A catechol-containing water-soluble polymer of the formula:

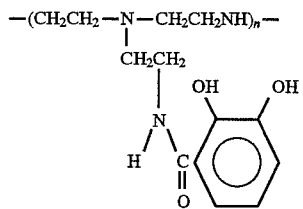

was prepared by the following procedure. 2,3-Dihydroxybenzoic acid (7.6 g, 50 mmole) was dissolved in thionyl chloride (25 mL). The solution was stirred at reflux for three hours. The excess thionyl chloride was removed under reduced pressure using a Dean Stark trap. The residue was sublimed under vacuum at 120° C. to yield 7.5 g (70%) of a white solid (melting point 84° C).

In a reaction flask, polyethyleneimine (Polymin Waterfree, 2.50 g) was dissolved in tetrahydrofuran (35 mL). The acid chloride (3.17) was slowly added to the reaction flask resulting in the formation of a precipitate. The solution was stirred for one hour and the solvent removed under reduced pressure leaving a light brown solid. The solid was dissolved in water and adjusted to pH of 10.5 with potassium hydroxide followed by purification by ultrafiltration through a 30,000 MWCO cartridge to yield a reddish-brown solid upon removal of water under vacuum.

EXAMPLE C

A hydroxamic acid containing water-soluble polymer of the formula

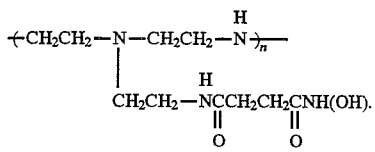

was prepared by the following procedure. Hydroxylamine hydrochloride (2.78 g, 39.97 mmol) was dissolved in methanol (15 mL). Potassium hydroxide (2.24 g, 39.97 mmol), dissolved in methanol (10 mL), was added dropwise to the hydroxylamine solution. The mixture was stirred for 1 hour after which the precipitated potassium chloride was collected by filtration. To the filtrate was added solid succinic anhydride (4.00 g, 39.90 mmol). The mixture was stirred at room temperature for 3 hours. The solvent was removed under reduced pressure leaving a white sticky solid. The solid was allowed to sit under anhydrous diethyl ether for one hour. The solid was collected by filtration giving 4.80 g of the monohydroxamic acid of succinic acid as a white solid. M.p. 72°–82° C.

The monohydroxamic acid of succinic acid (1.00 g, 7.51 mmol), dicyclohexylcarbodiimide (DCC) (1.54 g, 7.51 mmol) and a catalytic amount of 4-(dimethylamino)pyridine were dissolved in tetrahydrofuran (THF) (10 mL). After stirring for 24 hours at room temperature, the solution was filtered to remove the DCU (dicyclohexylurea) byproduct. This THF solution was added to a methanolic solution containing polyethyleneimine (PEI) (1.29 g, 29.95 mmol monomer eq.), a small amount of phenolphthalein, and enough sodium methoxide to make the solution pink. The solution was stirred for 5 hours. The solvent was evaporated and the product purified by dissolving in water and diafiltration through a 30,000 MWCO hollow-fiber membrane. Evaporation of the water followed by drying under vacuum at 60° C. gave 1.21 g of a white polymer. Testing with the iron chloride test gave a dark red color.

EXAMPLE 1

A water-soluble polymer prepared from commercially available polyethyleneimine as in example B was evaluated for the ability to bind iron in aqueous ferricyanide solutions.

Evaluations using a cyanide specific electrode indicated that upon addition of the water-soluble polymer to a basic solution containing potassium ferricyanide, free cyanide was immediately released in a quantitative amount with an immediate solution color change, indicating complexation of iron by the water-soluble polymer. Thus, water-soluble polymers such as described can be used to form polymer-metal complexes with the metal of a metal-cyanide complex, thereby, freeing the cyanide group for treatment or separation from the waste stream.

EXAMPLE 2

The catechol polymer prepared in example B was tested for its ability to release cyanide from the copper-cyanide, zinc-cyanide, cadmium-cyanide, and nickel-cyanide complexes. In the presence of a cyanide specific electrode which had been calibrated, was added 40 ppm of sodium cyanide followed by 12 ppm of copper (or the other respective metal ions) to form metal-cyanide complexes. The concentration of cyanide dropped dramatically indicating the formation of metal cyanide complexes (the electrode only records free cyanide). The polymer from example B (25 ppm, branched polymer, approx. 30,000 MW) was added to the solution and the solution was monitored for the increase of cyanide ion. Within a few minutes there were large increases in the amount of free cyanide in the solution indicating that cyanide was released from all the metals.

EXAMPLE 3

The commercially available polyethyleneimine (Polymin Waterfree, 30,000 MWCO from BASF) was tested for its ability to release cyanide from the copper-cyanide, cadmium-cyanide, zinc-cyanide and nickel-cyanide complexes. In the presence of a cyanide specific electrode which had been calibrated, was added 40 ppm of sodium cyanide followed by 12 ppm of the respective metal ion (copper, zinc, cadmium, or nickel) to form the metal-cyanide complex. The concentration of cyanide dropped dramatically indicating the formation of the metal-cyanide complex (the electrode only records free cyanide). Polyethyleneimine (BASF, a branched polymer of approx. 30,000 MW) was added as a dilute solution to the metal-cyanide complex-containing solution in an amount sufficient to yield a polymer concentration of about 25 ppm and the solution was monitored for the increase of cyanide ion. Within a short time there were large increases in the amount of free cyanide in the solution and the solution turned the bright blue color of a copper-polyethyleneimine complex indicating that copper was bound to the polymer and the cyanide was released from the copper. The other complexes were colorless.

EXAMPLE 4

To demonstrate regeneration of the polymer, the polyethyleneimine-copper complex from example 3 under near neutral to basic was treated with hydrochloric acid to reduce the pH of the solution to 2 (in the absence of cyanide ions as toxic HCN would be released if a CN$^-$ solution is made acidic). The solution turned from a bright color blue (amine-copper complex) to a very pale blue color indicating that the metal complex was broken. The solution, when diafiltered with 5 volume equivalents of pH 2 water, gave nearly quantitative recovery of copper metal ions. The free PEI was thus ready to start another cycle of binding more copper and displacing more cyanide form the copper-cyanide complex.

EXAMPLE 5

The water-soluble polymer prepared in example C was tested for its ability to release cyanide from a nickel-cyanide complex. In the presence of a cyanide specific electrode which had been calibrated, was added 40 ppm of sodium cyanide followed by 12 ppm of nickel to form the metal-cyanide complex. The concentration of cyanide dropped dramatically indicating the formation of the metal-cyanide complex (the electrode only records free cyanide). The polymer prepared in example C was added as a dilute solution to the metal-cyanide complex-containing solution in an amount sufficient to yield a polymer concentration of about 25 ppm and the solution was monitored for the increase of cyanide ion. Within a short time there were large increases in the amount of free cyanide in the solution indicating that cyanide was released from all the nickel.

Although the present invention has been described with reference to specific details, it is not intended that such details should be regarded as limitations upon the scope of the invention, except as and to the extent that they are included in the accompanying claims.

What is claimed is:

1. A process of displacing and separating cyanide ions and metal ions from metal-cyanide complexes contained in an aqueous solution comprising:

contacting the aqueous solution with a reaction solution containing a water soluble metal chelating polymer under conditions and for time sufficient to displace cyanide from the metal-cyanide complex and to form a water-soluble polymer-metal complex, the reaction solution including an effective amount of a water soluble polymer having nitrogen-, oxygen-, or sulfur-containing groups capable of binding a metal component of a metal-cyanide complex thereby forming said water-soluble polymer-metal complex as said cyanide is displaced, and, treating the aqueous solution by ultrafiltration effective to separate cyanide, water, and other low molecular weight materials from the aqueous solution while retaining a concentrated aqueous solution of water-soluble polymer-metal complex.

2. The process of claim 1 further comprising contacting the concentrated aqueous solution of water-soluble polymer-metal complex with a material selected from the group consisting of an acid, a reducing agent, and a complexent under conditions effective to release the metal ion from the water-soluble polymer-metal complex and to form regenerated water-soluble polymer.

3. The process of claim 2 further comprising removing the released metal ions by ultrafiltration effective to separate the released metal ions from said concentrated aqueous solution including said regenerated water-soluble polymer.

4. The process of claim 3 further comprising recycling the concentrated aqueous solution including said regenerated water-soluble polymer as reaction solution for contact with additional metal-cyanide complex-containing aqueous solution.

5. The process of claim I wherein said metal-cyanide complexes are selected from the group consisting of iron cyanide, cadmium cyanide, nickel cyanide, copper cyanide and zinc cyanide.

6. The process of claim 1 wherein the water-soluble polymer is of a formula selected from the group consisting of:

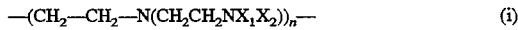

$$—(CH_2—CH_2—N(CH_2CH_2NX_1X_2))_n— \quad (i)$$

wherein $X_1$ and $X_2$ in each unit of the polymer are each a group independently selected from a substituent selected from —H;

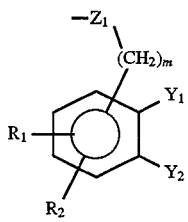

wherein $Y_1$ and $Y_2$ are selected from the OH and SH, $Z_1$ is selected from $CH_2$, $C=O$, $-SO_2$, and $-PO_2$, $R_1$ and $R_2$ are selected from H, alkyl, $SO_3H$, $CO_2H$, $PO_3H_2$, aminoalkyl, hydroxyalkyl, sulfoalkyl, and carboxyalkyl, m is a integer between 0 and 3, is 0 or 1, and n is an integer between about 12 and 12,000; and wherein the water-soluble polymer has a molecular weight of between about 1000 and about 1,000,000;

$$-[Q_p(CH_2)_mC(O)N(OH)R]$$

wherein Q is $C=O$ and p is 0 or 1, R is selected from H, alkyl, and aryl, m is an integer between 1 and 5, and n is an integer between about 12 and about 12,000; and wherein the water-soluble polymer has a molecular weight of between about 1000 and about 1,000,000; or

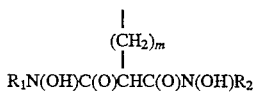

wherein $R_1$ and $R_2$ are each independently selected from H, alkyl, and aryl, m is an integer between 1 and 5, and n is an integer between about 12 and about 12,000; and wherein the water-soluble polymer has a molecular weight of between about 1000 and about 1,000,000;

$$-(CH_2CH(OX_3))_n- \qquad (ii)$$

wherein $X_3$ in each unit of the polymer is a group independently selected from a substituent selected from

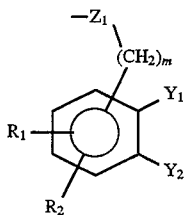

wherein $Y_1$ and $Y_2$ are selected from the OH and SH, $Z_1$ is selected from $CH_2$, $C=O$, $-SO_2$, and $-PO_2$, $R_1$ and $R_2$ are selected from H, alkyl, $SO_3H$, $CO_2H$, $PO_3H_2$, aminoalkyl, hydroxyalkyl, sulfoalkyl, and carboxyalkyl, m is a integer between 0 and 3, and n is an integer between about 24 and about 24,000; and wherein the water-soluble polymer has a molecular weight of between about 1000 and about 1,000,000;

$$-[Q_p(CH_2)_mC(O)N(OH)R]$$

wherein Q is $C=O$ and p is 0 or 1, R is selected from H, alkyl, and aryl, m is an integer between 1 and 5, and n is an integer between about 24 and about 24,000; and wherein the water-soluble polymer has a molecular weight of between about 1000 and about 1,000,000; or

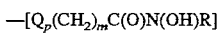

wherein the water-soluble polymer has a molecular weight of between about 1000 and about 1,000,000; or

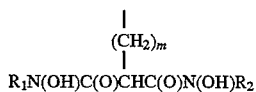

wherein $R_1$ and $R_2$ are each independently selected from H, alkyl, and aryl, m is an integer between 1 and 5, and n is an integer between about 24 and about 24,000; and wherein the water-soluble polymer has a molecular weight of between about 1000 and about 1,000,000;

$$-(CH_2CH((CH_2)_nNX_4X_5))_n- \qquad (iii)$$

wherein $X_4$ and $X_5$ in each unit of the polymer are a group independently selected from a substituent selected from H;

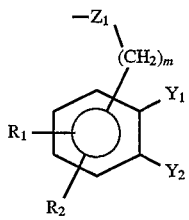

wherein $Y_1$ and $Y_2$ are selected from the OH and SH, $Z_1$ is selected from $CH_2$, $C=O$, $-SO_2$, and $-PO_2$, $R_1$ and $R_2$ are selected from H, alkyl, $SO_3H$, $CO_2H$, $PO_3H_2$, aminoalkyl, hydroxyalkyl, sulfoalkyl, and carboxyalkyl, m is a integer between 0 and 3, and n is an integer between about 24 and about 24,000; and wherein the water-soluble polymer has a molecular weight of between about 1000 and about 1,000,000;

$$-[Q_p(CH_2)_mC(O)N(OH)R]$$

wherein Q is $C=O$ and p is 0 or 1, R is selected from H, alkyl, and aryl, m is an integer between 1 and 5, and n is an integer between about 24 and about 24,000; and wherein the water-soluble polymer has a molecular weight of between about 1000 and about 1,000,000; or

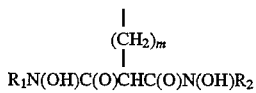

wherein $R_1$ and $R_2$ are each independently selected from H, alkyl, and aryl, m is an integer between 1 and 5, and n is an integer between about 24 and about 24,000; and wherein the water-soluble polymer has a molecular weight of between about 1000 and about 1,000,000;

$$-(CH_2CH(C(O)NX_6X_7))_n- \qquad (iv)$$

wherein $X_6$ and $X_7$ in each unit of the polymer is a group independently selected from a substituent selected from H;

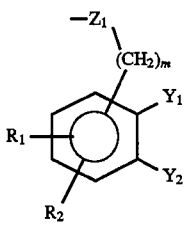

wherein $Y_1$ and $Y_2$ are selected from the OH and SH, $Z_1$ is selected from $CH_2$, $C=O$, $-SO_2$, and $-PO_2$, $R_1$ and $R_2$ are selected from H, alkyl, $SO_3H$, $CO_2H$, $PO_3H_2$, aminoalkyl, hydroxyalkyl, sulfoalkyl, and carboxyalkyl, m is a integer between 0 and 3, and n is an integer between about 24 and about 24,000; and wherein the water-soluble polymer has a molecular weight of between about 1000 and about 1,000,000;

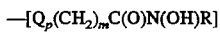

wherein Q is $C=O$ and p is 0 or 1, R is selected from H, alkyl, and aryl, m is an integer between 1 and 5, and n is an integer between about 24 and about 24,000; and wherein the water-soluble polymer has a molecular weight of between about 1000 and about 1,000,000; or

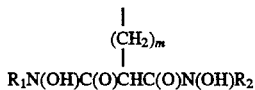

wherein $R_1$ and $R_2$ are each independently selected from H, alkyl, and aryl, m is an integer between 1 and 5, and n is an integer between about 24 and about 24,000; and wherein the water-soluble polymer has a molecular weight of between about 1000 and about 1,000,000.

7. The process of claim 1 wherein said treating the aqueous solution by ultrafiltration is ultrafiltration in the MWCO range of 1000 to 1,000,000.

8. The process of claim 1 further including recovery, separation, and purification of the cyanide separated by the ultrafiltration of the aqueous solution.

9. The process of claim 1 wherein the cyanide ion in the cyanide-containing solution removed by the ultrafiltration is destroyed or reduced in concentration in the aqueous solution.

10. The process of claim 3 further including recovery, separation, and purification of the metal ions removed by the ultrafiltration.

11. The process of claim 1 wherein the water-soluble polymer is represented by formula (i).

12. The process of claim 1 wherein the water-soluble polymer is represented by formula (ii).

13. The process of claim 1 wherein the water-soluble polymer is represented by formula (iii).

14. The process of claim 1 wherein the water-soluble polymer is represented by formula (iv).

15. A method of recovering cyanide from a metal-cyanide complex contained in aqueous streams comprising:

contacting an aqueous solution including concentrations of a metal-cyanide complex with a water-soluble polymer whereby cyanide is displaced from said metal-cyanide complex and a water-soluble polymer-metal complex is formed;

separating the water-soluble polymer-metal complex from the cyanide-containing aqueous solution, said aqueous solution retaining the cyanide; and, treating the aqueous solution retaining the cyanide to recover the cyanide within said aqueous solution.

16. A method of recovering metal ions from a metal-cyanide complex contained in aqueous streams comprising:

contacting an aqueous solution including concentrations of a metal-cyanide complex with a water-soluble polymer whereby cyanide is displaced from said metal-cyanide complex and a water-soluble polymer-metal complex is formed;

separating the water-soluble polymer-metal complex from the cyanide-containing aqueous solution, said aqueous solution retaining the cyanide;

separating the metal ion from the water-soluble polymer-metal complex; and, recycling the water-soluble polymer to the contacting step.

* * * * *